US012030067B2

(12) United States Patent
Angst

(10) Patent No.: US 12,030,067 B2
(45) Date of Patent: Jul. 9, 2024

(54) SPRAY GUN COMPRISING A TRIGGER COUPLING MEMBER HAVING A DEPLOYED CONFIGURATION

(71) Applicant: EXEL INDUSTRIES, Epernay (FR)

(72) Inventor: Christoph Angst, Eichberg (CH)

(73) Assignee: EXEL INDUSTRIES, Epernay (FR)

( * ) Notice: Subject to any disclaimer, the term of this patent is extended or adjusted under 35 U.S.C. 154(b) by 340 days.

(21) Appl. No.: 17/610,970

(22) PCT Filed: May 26, 2020

(86) PCT No.: PCT/EP2020/064508
§ 371 (c)(1),
(2) Date: Nov. 12, 2021

(87) PCT Pub. No.: WO2020/239728
PCT Pub. Date: Dec. 3, 2020

(65) Prior Publication Data
US 2022/0258186 A1 Aug. 18, 2022

(30) Foreign Application Priority Data
May 27, 2019 (FR) ...................................... 1905598

(51) Int. Cl.
*B05B 1/30* (2006.01)
*B05B 9/01* (2006.01)
*B05B 12/00* (2018.01)

(52) U.S. Cl.
CPC .............. *B05B 1/3046* (2013.01); *B05B 9/01* (2013.01); *B05B 12/0022* (2018.08)

(58) Field of Classification Search
CPC ...... B05B 1/3046; B05B 12/0022; B05B 9/01
(Continued)

(56) References Cited

U.S. PATENT DOCUMENTS 1,980,464 A * 11/1934 Yedd .......................... B05B 7/24 239/526
3,294,362 A * 12/1966 Schultz ..................... B05B 9/01 251/239
(Continued)

FOREIGN PATENT DOCUMENTS

CN 101466475 A 6/2009
CN 102215981 A 10/2011
(Continued)

OTHER PUBLICATIONS

INPI Rapport de Recherche Préliminaire for Patent Application No. FR 1905598, Feb. 3, 2020, 2 pp.
(Continued)

*Primary Examiner* — Steven J Ganey
(74) *Attorney, Agent, or Firm* — Soquel Group LLC

(57) ABSTRACT

A spray gun for fluid, including a body defining an internal pipe, a shutoff member which is movable between a release position and a shutoff position of the internal pipe, a connecting member rigidly connected to the shutoff member, a coupling member having an engaged configuration in which it is fixed relative to the body, and a trigger pivotably mounted about a primary axis relative to the connecting member and about a secondary axis relative to the coupling member, the primary and secondary axes being parallel. The coupling member has a deployed configuration in which it is mobile in translation relative to the body in a direction orthogonal to the primary and secondary axes.

14 Claims, 3 Drawing Sheets

(58) Field of Classification Search
USPC ................................ 239/525, 526, 583, 586
See application file for complete search history.

(56) References Cited

U.S. PATENT DOCUMENTS

| | | | | | |
|---|---|---|---|---|---|
| 3,698,644 | A * | 10/1972 | Nystuen | D06F 43/002 239/526 |
| 5,699,968 | A * | 12/1997 | Hung | B05B 12/002 239/526 |
| 6,675,994 | B2 * | 1/2004 | Yamamoto | B05B 1/3073 239/526 |

FOREIGN PATENT DOCUMENTS

| | | | |
|---|---|---|---|
| CN | 203437244 | U | 2/2014 |
| CN | 203508251 | U | 4/2014 |
| CN | 204134786 | U | 2/2015 |
| DE | 8333558 | U1 | 2/1984 |
| JP | 3117526 | U | 11/2005 |
| WO | 199413406 | A1 | 6/1994 |
| WO | 2012072205 | A2 | 6/2012 |
| WO | 2014189655 | A1 | 11/2014 |

OTHER PUBLICATIONS

International Search Report for Patent Application No. PCT/EP2020/064508, Sep. 7, 2020, 2 pp.

* cited by examiner

SPRAY GUN COMPRISING A TRIGGER COUPLING MEMBER HAVING A DEPLOYED CONFIGURATION

CROSS-REFERENCE TO RELATED APPLICATIONS

This application claims benefit under 35 USC § 371 of PCT Application No. PCT/EP2020/064508 entitled SPRAY GUN COMPRISING A TRIGGERING COUPLING MEMBER HAVING A DEPLOYED CONFIGURATION, filed on May 26, 2020 by inventor Christoph Angst. PCT Application No. PCT/EP2020/064508 claims priority of French Patent Application No. 19 05598, filed on May 27, 2019.

FIELD OF THE INVENTION

The present invention relates to a spray gun for applying a fluid, of the type comprising:

- a body defining a supply orifice for supplying the spray gun with fluid, a discharge orifice for discharging fluid from the spray gun, and an internal pipe fluidly connecting the supply orifice to the discharge orifice,
- a shutoff member movable relative to the body between a release position of the internal pipe, in which it allows the fluid to circulate between the supply and discharge orifices, and a shutoff position of the internal pipe, in which it opposes the circulation of the fluid between the supply and discharge orifices,
- a connecting member rigidly connected to the shutoff member,
- a coupling member having an engaged configuration in which said coupling member is fixed relative to the body, and
- a trigger pivotably mounted about a primary axis relative to the connecting member and about a secondary axis relative to the coupling member, the primary and secondary axes being substantially parallel to one another.

The invention also relates to a facility for applying a fluid comprising a spray gun of the aforementioned type and a device for supplying the spray gun with fluid.

The invention also relates to a method for using such a spray gun.

BACKGROUND OF THE INVENTION

"Fluid product" here and hereinafter refers to a product having a viscosity of between 1 mPa·s and 2,000,000 mPa·s, this viscosity for example being measured using a Brookfield Plan Cone viscosimeter under normal temperature and pressure conditions. This expression thus encompasses products in liquid state, perfectly deformable and with a low viscosity, as well as products generally described as "pasty," more viscous than liquids and having a state midway between the liquid state and the solid state.

Spray guns of the aforementioned type are known, in which the coupling member has only the engaged configuration. In other words, in these known spray guns, the coupling member is permanently fastened to the body. Most often, the coupling member is also simply made up of a part of the body.

These spray guns are intended for manual use, an operator having to actuate the trigger in order to allow the shutoff member to move into its release position. Indeed, since the coupling member is fixed relative to the body, actuating the trigger causes the trigger to move closer to the body by pivoting about the secondary axis, and thus causes the primary axis and the connecting member to move toward the rear and therefore causes the shutoff member to move into its release position.

These spray guns are generally used for the extrusion or the spraying of pasty products such as putties or elastomer or epoxy glues. To this end, these spray guns are most often supplied by devices providing the fluid at very high pressure, typically at a pressure of the order of 500 bars.

This supply pressure makes these spray guns dangerous, since a simple handling error can cause a ball of fluid to be sprayed, at very high speed, toward a part of the body of an operator, this fluid ball being able, due to its speed, to cause irreparable damage to the targeted body part. Operators have thus already lost a hand or an eye due to such handling errors.

To prevent them from being actuated inadvertently and thus being able to cause such bodily injury, it is known to equip the spray guns with members for immobilizing the trigger in its position away from the body. These immobilizing members generally assume the form of a stop piece mounted pivoting on the body and having a position folded against the stock of the gun and an unfolded position in which the stop piece extends between the stock and the trigger, thus preventing the trigger from being brought closer to the stock.

This solution is not, however, fully satisfactory. Indeed, the stop piece is most often not very ergonomic to use. It is further not very safe, since it can easily be removed involuntarily. Additionally, it increases the bulk of the gun by preventing it from being stored with the trigger abutting against the stock.

It would therefore be beneficial to provide a more ergonomic, safer solution which allows the gun to be stored with the trigger abutting against the stock.

Another issue encountered with these known spray guns is the adjustment of the maximum discharge flow rate of the fluid outside the gun. Most often, the shutoff member is formed by a needle which, in the shutoff position, bears against a seat arranged in the internal pipe, and the adjustment of the maximum flow rate is obtained by adjusting the displacement travel of this needle. To this end, it is known to provide a breech which is movable relative to the body and serves as a stop for the needle in the release position: thus, when the breech is close to the seat, the needle cannot move away from the seat very much and the maximum flow rate is limited and, when the breech is away from the seat, the needle can move a great distance from the seat and the maximum flow rate is significant.

This solution is not, however, fully satisfactory. Indeed, the breech being easily accessible, it can be moved by any person. It can in particular be moved involuntarily, or by an operator having incorrectly understood the instructions, which in this case causes defects regarding the quantity of product applied.

It would therefore be beneficial to develop a solution making it possible for the maximum discharge flow rate of the fluid only to be able to be adjusted by an authorized person, for example a shop foreman.

SUMMARY OF THE DESCRIPTION

One aim of the invention is thus to reduce the risks of a spray gun being able to be actuated inadvertently. To this end, aims of the invention are to propose a solution for deactivating a spray gun which is simple, ergonomic and safe. Other aims of the invention are to reduce the space requirement of the spray gun, in particular during storage thereof, and to make it possible for the maximum discharge flow rate of the fluid only to be able to be adjusted by a limited number of people.

To this end, the invention relates to a spray gun of the aforementioned type, in which the coupling member also has a deployed configuration in which the coupling member is translatable relative to the body along a translation direction substantially orthogonal to the primary and secondary axes.

According to specific embodiments of the invention, the spray gun also has one or more of the following features, considered alone or according to any technically possible combination(s):—the coupling member comprises a slide mounted mobile in translation in a guideway rigidly connected to the body and oriented along the direction of translation, the spray gun further comprising an immobilizing device able to immobilize the slide in the guideway;

- the travel of the slide in the guideway is sufficient so that, when the coupling member is in its deployed configuration, the trigger can come closer to the body by pivoting about the primary axis until reaching a stop position without the slide abutting in the guideway;
- the immobilizing device comprises a removable stop which is movable relative to the body between a blocking position in which said removable stop is positioned in the axis of the guideway such that a bearing surface of the coupling member can bear against the removable stop, the coupling member then being in its engaged configuration, and a disengaged position, in which said removable stop is away from the guideway such that the bearing surface of the coupling member cannot bear against the removable stop, the coupling member then being in its deployed configuration;
- the removable stop is mounted pivoting between its blocking and deployed positions about a tertiary axis parallel to the direction of translation;
- the body comprises a fixed stop positioned in the guideway axis such that the slide is inserted between the removable stop and the fixed stop, said fixed stop being positioned such that, when the removable stop is in its blocking position, the coupling member is bearing substantially simultaneously against the fixed and removable stops;
- the coupling member comprises a pin rigidly connected to the slide and protruding along the translation direction relative to the slide up to a crest which is distant from the slide, said crest defining the bearing surface against the removable stop;
- the distance from the crest to the slide is adjustable;
- the pin comprises a threaded rod screwed to the slide;
- the pin has, facing the fixed stop, a recess able to receive a screwing tool, and the fixed stop has a through orifice positioned in the axis of the pin for the passage of said screwing tool;
- the trigger has a gripping surface, the primary axis being inserted between said gripping surface and the secondary axis, and the removable stop is positioned in front of the guideway, between the guideway and the discharge orifice;
- the spray gun comprises a return member for returning the shutoff member toward its shutoff position;
- the fluid has a viscosity of between 3,000 and 300,000 mPa·s;
- the shutoff member is translatable relative to the body between its release and shutoff positions along a direction which is substantially parallel to the direction of translation; and
- the internal pipe defines a seat, the shutoff member being formed by a needle which bears against the seat when the shutoff member is in its shutoff position, and is away from the seat when the shutoff member is in its release position.

The invention also relates to a facility for applying a fluid comprising a spray as defined above and a device for supplying the spray gun with fluid.

The invention also relates to a method for using a spray gun as defined above, comprising the following successive steps:

- providing the spray gun, the shutoff member being in its shutoff position and the coupling member being in its engaged configuration,
- actuating the trigger, this actuation causing the trigger to move closer to the body by pivoting about the secondary axis, and thus causing the primary axis and the connecting member to move toward the rear and causing the shutoff member to move into its release position,
- applying the fluid,
- releasing the trigger, this release causing the trigger to move away from the body by pivoting about the secondary axis, and thus causing the primary axis to move forward and causing the shutoff member to return to its shutoff position,
- switching the coupling member into its deployed configuration, and
- actuating the trigger, this actuation causing the trigger to move closer to the body by pivoting about the primary axis, and thus causing the secondary axis and the coupling member to move forward, the shutoff member remaining in its shutoff position.

BRIEF DESCRIPTION OF THE DRAWINGS

Other features and advantages of the invention will appear upon reading the following description, provided solely as an example and done in reference to the appended drawings, in which.

DETAILED DESCRIPTION OF EMBODIMENTS

Figure 1:
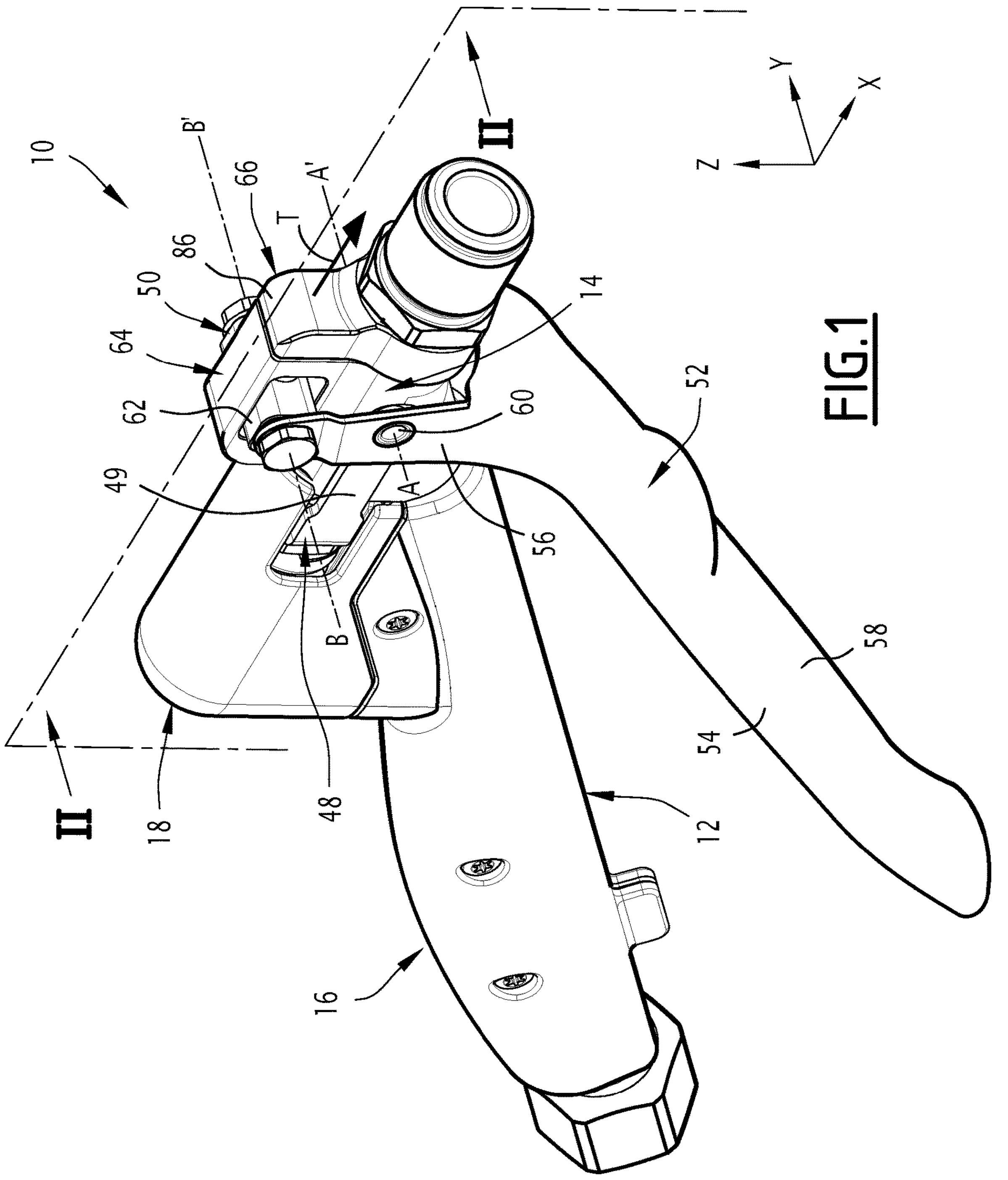
FIG. 1 is a perspective view of a spray gun according to the invention, the coupling member being in the engaged configuration and the trigger being away from the body.

The spray gun 10 shown in FIG. 1 is intended for the application of a fluid product. It typically belongs to a facility (not shown) for applying this fluid, said facility comprising the spray gun 10 and a device (not shown) for supplying the spray gun 10 with fluid.

The fluid is preferably a high viscosity product, that is to say, with a viscosity of between 3000 and 300,000 mPa·s, for example a putty or an elastomer or epoxy glue. In a variant, the fluid is a liquid product, for example water or a paint.

The supply device is typically suitable for supplying the gun 10 with the fluid at very high pressure, that is to say, a pressure greater than 300,000 hPa and for example between 450,000 and 550,000 hPa.

The spray gun 10 comprises, in a known manner, a body 12 in gun form, that is to say having a first part 14, hereinafter called "barrel," comparable to the barrel of a gun, and a second part 16, hereinafter called "stock," comparable to the stock of a gun. In the illustrated example, the body 10 also comprises a third part 18, hereinafter called "breech," comparable to the breech of a gun.

Hereinafter, the orientation terms will be understood in reference to the standard orientation guns, shown in the Figures, and which shows:

- a longitudinal axis X, oriented from back to front,
- a transverse axis Y, oriented from right to left, perpendicular to the longitudinal axis X and forming a horizontal plane with the latter, and
- a vertical axis Z, oriented from bottom to top, perpendicular to the horizontal plane and forming a direct orthogonal coordinate system with the axes X and Y.

The barrel 14 is elongated along the longitudinal direction X. It has a front end 20 that defines the front end of the body 12.

The stock 16 extends vertically downward from a rear end of the barrel 14. In the illustrated example, the stock 16 extends vertically downward from a rear end of the barrel 14.

The stock 16 is inclined longitudinally and vertically relative to the barrel 14.

The stock 16 has a distal end 22 opposite the barrel 14. In other words, the distal end 22 constitutes the end of the stock 16 furthest from the barrel 14.

This distal end 22 defines the lower end of the body 12. In the illustrated example, the distal end 22 also defines the rear end of the body 12.

The stock 16 forms a gripping handle of the spray gun 10 by an operator.

The breech 18 extends vertically downward from a rear end of the barrel 14. It is positioned substantially in the longitudinal extension of the barrel 14.

Figure 2:
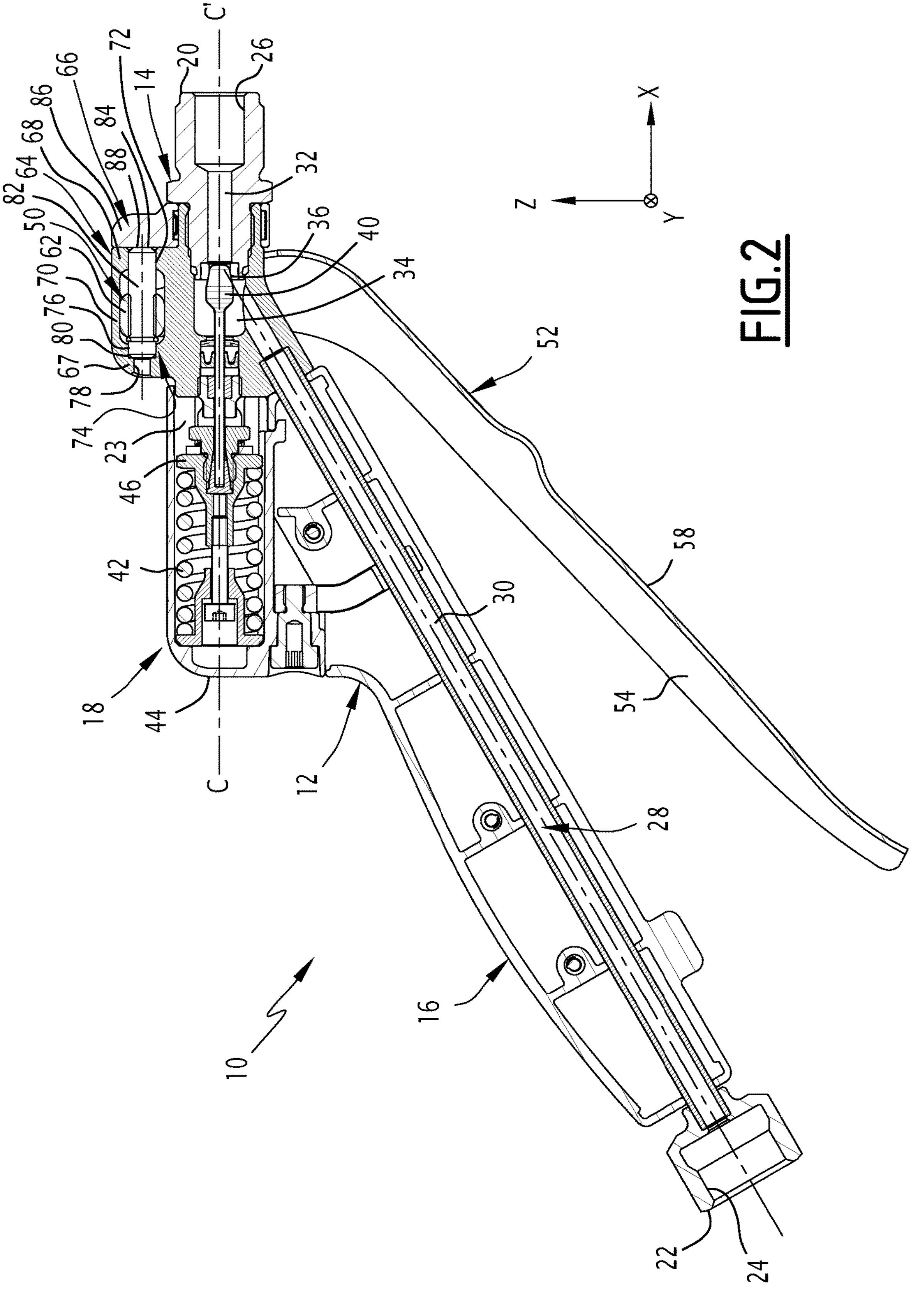
FIG. 2 is a sectional view along plane II-II of FIG. 1.

As shown in FIG. 2, the breech 18 inwardly defines a cavity 23 between the breech 18, the stock 16 and the barrel 14.

In reference to FIG. 2, the body 12 defines a supply orifice 24 for supplying the spray gun 10 with fluid, a discharge orifice 26 for discharging fluid from the spray gun 10, and an internal pipe 28 fluidly connecting the supply orifice 24 to the discharge orifice 26.

The supply orifice 24 is suitable for connecting a supply member (not shown) supplying the gun 10 with a fluid, this supply member typically being made up of a flexible tube. To this end, the supply orifice 24 here has an internal thread.

The supply orifice 24 here is formed at the distal end 22 of the stock 16.

The discharge orifice 26 is arranged in the front end 20 of the barrel 14.

Here, the discharge orifice 26 is suitable for mounting a nozzle (not shown) for shaping the fluid at the outlet of the spray gun 10, that is to say, for example for shaping it in the form of a cord of product or to cause spraying thereof. To this end, the discharge orifice 26 has an internal thread in the illustrated example.

In a variant (not shown), the discharge orifice 26 is in turn suitable for shaping the fluid product at the outlet of the spray gun 10.

The internal pipe 28 comprises a first portion 30 housed in the stock 16, a second portion 32 housed in the barrel 14 and, at the interface between the first and second portions 30, 32, a chamber 34.

The first portion 30 extends from the supply orifice 24 to the chamber 34. In the illustrated example, this first portion 30 is rectilinear; it is in particular elongated along a direction inclined downward relative to the longitudinal direction X.

The second portion 32 extends from the chamber 34 to the discharge orifice 26. In the illustrated example, this second portion 32 is rectilinear; it is in particular elongated along the longitudinal direction X.

The chamber 34 here is housed in the barrel 14. It is positioned behind the second portion 32.

The chamber 34 has a straight section larger than the straight section of the second portion 32. Thus, the internal pipe 28 defines a seat 36 at the junction between the chamber 34 and the second portion 32.

The seat 36 in particular has a frustoconical shape flared toward the chamber 34.

The spray gun 10 also comprises a shutoff member 40. This shutoff member 40 is movable relative to the body 12 between a release position of the internal pipe 28, in which it allows the fluid to circulate between the supply 24 and discharge 26 orifices, and a shutoff position of the internal pipe 28, in which it opposes the circulation of the fluid between the supply 24 and discharge 26 orifices.

The shutoff member 40 is in particular translatable relative to the body 12 between its released and shutoff positions along the longitudinal direction X.

The shutoff member 40 here is formed by a needle that bears against the seat 36 when the shutoff member 40 is in its shutoff position, and is away from the seat 36 when the shutoff member 40 is in its release position. This offers great flexibility in the adjustment of the outlet flow rate of the fluid based on the movement of the shutoff member 40 between its shutoff and release positions.

The spray gun 10 further comprises a member 42 for returning the shutoff member 40 toward its shutoff position. This return member 42 here is formed by a compression spring oriented in the longitudinal direction X and compressed between, on the one hand, a bottom 44 of the breech 18 and, on the other hand, a stop 46 rigidly connected to the shutoff member 40.

The return member 42 is in particular housed in the cavity 23.

Returning to FIG. 1, the spray gun 10 also comprises a connecting member 48 rigidly connected to the shutoff member 40. This connecting member 48 here is formed by a yoke comprising two branches 49 (only the right branch 49 being visible in the Figures) spaced transversely apart from one another and sandwiching the body 12. Each branch 49 is in particular engaged in a corresponding longitudinal guide groove (not visible in the Figures) arranged in the outer surface of the body 12.

The spray gun 10 further comprises a coupling member 50 and a trigger 52.

The trigger 52 comprises a main branch 54 below the barrel 14 and two flanges 56 (only the right flange 56 being visible in the Figures). The flanges 56 are spaced transversely apart from one another and each extend upward from a respective lateral edge of the main branch 54. The flanges 56 sandwich the body 12, and more particularly the barrel 14.

The main branch defines a gripping surface 58 intended to receive at least one finger of an operator holding the stock 16 in his palm.

The trigger 52 is mounted pivoting about a transverse primary axis A-A' relative to the connecting member 48, this primary axis A-A' being, in the illustrated example, at the height of the barrel 14.

To this end, each flange 56 here has a protuberance 60 protruding toward the body 12 relative to the rest of the flange 56, said protuberance 60 being engaged in a respective guide groove of the body 12, in front of the branch 49 of the connecting member 48 received in said groove.

The trigger 52 is also mounted pivoting about a transverse secondary axis B-B' relative to the coupling member 50, this secondary axis B-B' being, in the illustrated example, above the barrel 14.

To this end, the flanges 56 here are passed through by a common shaft (not visible in the Figures) also engaged through the coupling member 50.

Thus, the trigger 52 is pivotably mounted about a primary axis A-A' relative to the connecting member 48 and about a secondary axis B-B' relative to the coupling member 50, the primary A-A' and secondary B-B' axes being substantially parallel to one another, the primary axis A-A' being inserted between the gripping surface 58 and the secondary axis B-B'.

The coupling member 50 has an engaged configuration, shown in FIGS. 1 and 2, in which said coupling member 50 is fixed relative to the body 12. Thus, when said coupling member 50 is in this configuration, it forms a pivot link between the trigger 52 and the body 12 such that the trigger 52 is rotatable about the secondary axis B-B' relative to the body 12 between an actuated position, in which the trigger 52 is close to the body and the shutoff member 40 is in its release position, and a priming position, in which the trigger 52 is away from the body and the shutoff member 40 is in its shutoff position.

Figure 3:
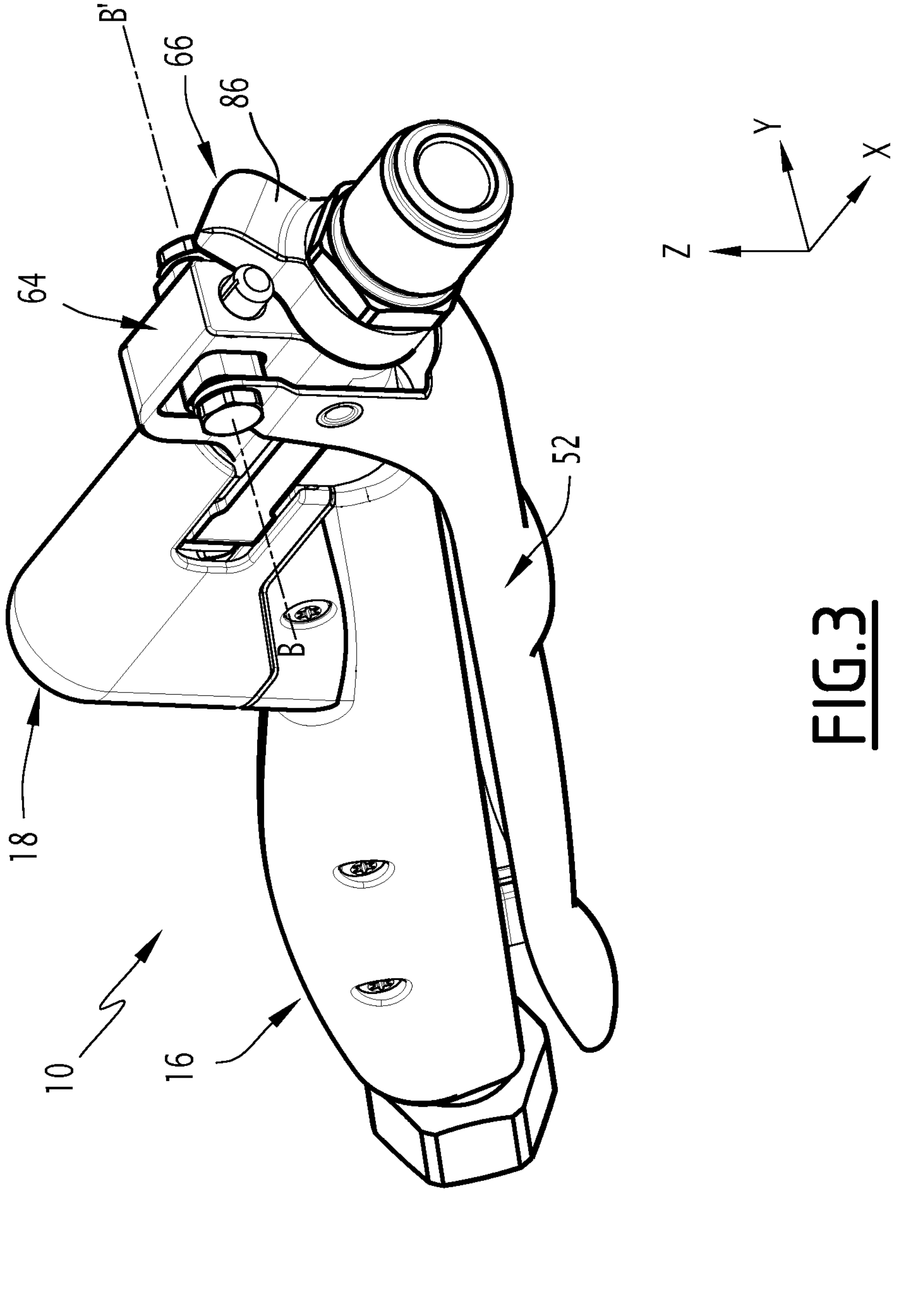
FIG. 3 is a perspective view of the spray gun of FIG. 1, the coupling member being in the deployed configuration and the trigger abutting against the body.

According to the invention, the coupling member 50 also has a deployed configuration, shown in FIG. 3, in which said coupling member 50 is mobile in translation relative to the body 12 in a longitudinal translation direction T, therefore substantially orthogonal to the primary A-A' and secondary B-B' axes. Thus, when said coupling member 50 is in this configuration, the trigger 52 is rotatable about the primary axis A-A' relative to the body 12 between the priming position and an inactive position, in which the trigger 52 is close to the body and the shutoff member 40 is in its shutoff position.

To this end, the coupling member 50 comprises a slide 62 mounted mobile in translation in a guideway 64 rigidly connected to the body 12 and oriented along the direction of translation T, and the spray gun 10 further comprises an immobilizing device 66 able to immobilize the slide 62 in the guideway 64.

The slide 62 is rigidly connected to the secondary axis B-B'.

In reference to FIG. 2, the guideway 64 here is defined by an upper surface of the barrel 14 and bounded at its longitudinal ends by a fixed rear stop 67 and a fixed front stop 68, both belonging to the body 12.

In the illustrated example, the fixed stops 67, 68 have a height equal to that of the slide 62. They are in particular connected to one another by an upper wall 70 keeping the slide 62 in the guideway 64.

Here, the fixed front stop 68 is pierced with a longitudinal through orifice 72. In the illustrated example, this through orifice 72 has a substantially constant straight section.

Here, the fixed rear stop 67 is also pierced with a longitudinal through orifice 74. This through orifice 74 is in particular substantially aligned with the through orifice 72.

In the illustrated example, the through orifice 74 has a first segment 76, on the guideway 64 side, with a first straight section, and a second segment 78, on the side outside the guideway 64, with a second straight section. The first segment 76 has a straight section greater than the second segment 78 and in particular substantially equal to the straight section of the through orifice 72. Thus, the through orifice 74 defines a shoulder 80 oriented toward the guideway 64.

The travel of the slide 62 in the guideway 64 is sufficient so that, when the coupling member 50 is in its deployed configuration, the trigger 52 can come closer to the body 12 by pivoting about the primary axis A-A' until reaching a stop position without the slide 62 abutting in the guideway 64. To this end, the fixed front stop 68 is positioned far enough forward.

In the illustrated example, the coupling member 50 also comprises a pin 82 rigidly connected to the slide 50 and protruding forward along the translation direction T relative to the slide 50 up to a crest 84 which is distant from the slide 50.

The pin 82 is substantially coaxial with the through orifice 72 and has a straight section smaller than the straight section of the through orifice 72. Thus, the pin 82 is suitable for passing through the orifice 72 during the sliding of the slide 62 in the guideway 64.

In the illustrated example, the pin 82 passes through the slide 62 and also protrudes toward the rear relative to the slide 62. The pin 82 then has a length substantially equal to the distance from the shoulder 80 to the front face of the fixed front stop 68.

The distance from the crest 84 to the slide 50 is advantageously adjustable.

To this end, the pin 82 is formed by a threaded rod screwed to the slide 50. Additionally, the pin 82 has, facing the fixed rear stop 67, a recess (not shown) able to receive a screwing tool, the second segment 78 of the through orifice 74, which is positioned in the axis of the pin 82, being suitable for the passage of said screwing tool.

The immobilizing device 66 comprises a removable stop 86 which is movable relative to the body 12 between a blocking position, shown in FIGS. 1 and 2, in which said removable stop 86 is positioned in the axis of the guideway 64 such that a bearing surface 88 of the coupling member 50 can bear against the removable stop 86, and a disengaged position, shown in FIG. 3, in which said removable stop 86 is away from the guideway 64 such that the bearing surface 88 of the coupling member 50 cannot bear against the removable stop 86.

The removable stop 86 is positioned in front of the guideway 64, between the guideway 64 and the discharge orifice 26. In particular, the immobilizing device 66 is such that, when the removable stop 86 is in its blocking position, it is alongside the front face of the fixed front stop 68.

The bearing surface 88 here is defined by the crest 84 of the pin 82.

Thus, in order for the removable stop 86 to be in its blocking position, it is necessary for the coupling member 50 to be withdrawn enough in the guideway 64 for the pin 82 not to protrude past the front stop 68. Furthermore, when the removable stop 86 is in this position, the slide 50 is inserted between the removable stop 86 and the fixed rear stop 67, the coupling member 50 then bearing substantially simultaneously against the removable stop 86 and the fixed rear stop 67; as a result, the coupling member 50 then cannot move along the translation direction T in the forward direction, this movement being prohibited by the removable stop 86, or toward the rear, this movement being prohibited by the fixed rear stop 67: the coupling member 50 is thus found in its engaged configuration.

Conversely, when the removable stop 86 is in its disengaged position, the coupling member 50 is free to move along the translation direction T toward the front until the trigger 52 abuts against the body 12 and toward the rear until the coupling member 50 abuts against the fixed rear stop 67: the coupling member 50 is then in its deployed configuration.

In the illustrated example, the removable stop 86 is mounted pivoting between its blocking and deployed positions about a longitudinal tertiary axis C-C' (FIG. 2), therefore parallel to the direction of translation T.

An example method for using the spray gun 10 will now be described, in reference to the Figures.

The spray gun 10, the coupling member 50 being in its engaged configuration and the trigger 52 being in its priming position, the shutoff member 40 is then in its shutoff position.

An operator then actuates the trigger 52 so as to bring it closer to the body 12. This actuation causes the trigger 52 to pivot about the secondary axis B-B', and as a result causes the primary axis A-A' and the connecting member 48 to move toward the rear and causes the shutoff member 40 to move into its release position.

The trigger 52 is thus moved until it abuts against the body 12. The shutoff member 40 is then at a first distance from the seat 36, and the fluid flow rate leaving the spray gun 10 reaches a first maximum value.

The trigger 52 is next released and, under the effect of the return member 42, it returns to its priming position, and the shutoff member 40 to its shutoff position.

A shop foreman then intervenes and, with a special tool which he introduces through the through orifice 74, he pivots the pin 82 about its axis. In so doing, he drives the movement of the slide 62 along the longitudinal direction X, for example toward the front.

An operator then actuates the trigger 52 again until bringing it into abutment against the body 12. The shutoff member 40 is then at a second distance from the seat 36, and the fluid flow rate leaving the spray gun 10 reaches a second maximum value. The second distance here is less than the first distance, and the second maximum value is therefore less than the first maximum value.

It is thus possible, by modifying the distance from the crest 84 of the pin 82 to the slide 62, to adjust the value of the maximum flow rate of the fluid leaving the spray gun 10.

The trigger 52 is next released and, under the effect of the return member 42, it returns to its priming position, and the shutoff member 40 to its shutoff position.

An operator next pivots the removable stop 86 about the tertiary axis C-C' so as to place it in its disengaged position: the coupling member 50 then finds itself in its deployed position.

An operator then once again actuates the trigger 52 so as to bring it closer to the body 12. This actuation this time causes the trigger 52 to pivot about the primary axis A-A', since the latter is immobilized owing to the action of the return member 42, and as a result causes the movement of the secondary axis B-B' and of the coupling member 50 in the forward direction. The pin 82 then passes through the fixed front stop 66 and protrudes toward the front from said fixed front stop 66, preventing the removable stop 86 from returning to the blocking position as long as the trigger 52 has not been returned to the priming position. The shutoff member 40 conversely stays in its shutoff position.

Thus, when the coupling member 50 is in its deployed position, it is possible to manipulate the spray gun 10 without risk.

Such a spray gun therefore in particular makes it possible to reduce the risks of being actuated inadvertently.

Furthermore, it also makes it possible to adjust the maximum ejection flow rate of the fluid by a limited number of people.

The invention claimed is:

1. A spray gun for applying a fluid, comprising:

a body defining a supply orifice for supplying the spray gun with fluid, a discharge orifice for discharging the fluid from the spray gun, and an internal pipe fluidly connecting the supply orifice to the discharge orifice;

a shutoff member movable relative to said body between a release position of the internal pipe, in which it allows the fluid to circulate between the supply and discharge orifices, and a shutoff position of the internal pipe, in which it opposes the circulation of the fluid between the supply and discharge orifices;

a connecting member rigidly connected to said shutoff member;

a coupling member having an engaged configuration in which said coupling member is fixed relative to said body, said coupling member comprising a slide mounted mobile in translation in a guideway rigidly connected to said body and oriented along the direction of translation;

an immobilizing device able to immobilize said slide in the guideway; and a trigger pivotably mounted about a primary axis relative to said connecting member and about a secondary axis relative to said coupling member, the primary and secondary axes being substantially parallel to one another, wherein said coupling member also has a deployed configuration in which said coupling member is translatable relative to said body along a translation direction substantially orthogonal to the primary and secondary axes.

2. The spray gun according to claim 1, wherein the travel of said slide in the guideway is sufficient so that, when said coupling member is in its deployed configuration, said trigger comes closer to said body by pivoting about the primary axis until reaching a stop position without said slide abutting in the guideway.

3. The spray gun according to claim 1, wherein said immobilizing device comprises a removable stop which is movable relative to said body between (i) a blocking position in which the removable stop is positioned in the axis of the guideway such that a bearing surface of said coupling member bears against the removable stop, said coupling member then being in its engaged configuration, and a disengaged position, in which the removable stop is located away from the guideway such that the bearing surface of said coupling member cannot bear against said removable stop, said coupling member then being in its deployed configuration.

4. The spray gun according to claim 3, wherein said removable stop is mounted pivoting between its blocking and deployed positions about a tertiary axis parallel to the direction of translation.

5. The spray gun according to claim 3, wherein said body comprises a fixed stop positioned in the guideway axis such that said slide is inserted between said removable stop and said fixed stop, said fixed stop being positioned such that, when said removable stop is in its blocking position, said coupling member bears substantially simultaneously against said fixed and said removable stops.

6. The spray gun according to claim 3, wherein said coupling member comprises a pin rigidly connected to said slide and protruding along the translation direction relative to said slide up to a crest which is distant from said slide, the crest defining the bearing surface against said removable stop.

7. The spray gun according to claim 6, wherein the distance from the crest to said slide is adjustable.

8. The spray gun according to claim 6, wherein said pin comprises a threaded rod screwed to said slide.

9. The spray gun according to claim 8, wherein said body comprises a fixed stop positioned in the guideway axis such that said slide is inserted between said removable stop and said fixed stop, said fixed stop being positioned such that, when said removable stop is in its blocking position, said coupling member bears substantially simultaneously against said fixed and said removable stops, and wherein said pin has, facing said fixed stop, a recess able to receive a screwing tool, and said fixed stop has a through orifice positioned in the axis of said pin for the passage of the screwing tool.

10. The spray gun according to claim 3, wherein said trigger comprises a gripping surface, the primary axis being inserted between the gripping surface and the secondary axis, and said removable stop is positioned in front of the guideway, between the guideway and the discharge orifice.

11. The spray gun according to claim 1, comprising a return member returning said shutoff member toward its shutoff position.

12. The spray gun according to claim 1, wherein the fluid has a viscosity of between 3,000 and 300,000 mPa·s.

13. A facility for applying a fluid comprising:

a spray gun according to claim 1; and a device for supplying said spray gun with fluid.

14. A method for using a spray gun, comprising:

providing a spray gun according to claim 1, the shutoff member of the spray gun being in its shutoff position and the coupling member of the spray gun being in its engaged configuration;

actuating the trigger of the spray gun, causing the trigger to move closer to the body of the spray gun by pivoting about the secondary axis of the trigger, and thus causing the primary axis of the trigger and the connecting member of the spray gun to move toward the rear and causing the shutoff member of the spray gun to move into its release position;

applying the fluid;

releasing the trigger, causing the trigger to move away from the body by pivoting about the secondary axis, and thus causing the primary axis to move forward and causing the shutoff member to return to its shutoff position;

switching the coupling member into its deployed configuration; and actuating the trigger, causing the trigger to move closer to the body by pivoting about the primary axis, and thus causing the secondary axis and the coupling member to move forward, the shutoff member remaining in its shutoff position.

* * * * *